US010972382B2

(12) United States Patent
Uscumlic et al.

(10) Patent No.: US 10,972,382 B2
(45) Date of Patent: Apr. 6, 2021

(54) DYNAMIC SHARED PROTECTION USING REDUNDANT NETWORK PATHS

(71) Applicant: Nokia Solutions and Networks Oy, Espoo (FI)

(72) Inventors: Bogdan Uscumlic, Bures-sur-Yvette (FR); Gopalasingham Aravinthan, Savigny sur-Orge (FR)

(73) Assignee: Nokia Solutions and Networks Oy, Espoo (FI)

( * ) Notice: Subject to any disclaimer, the term of this patent is extended or adjusted under 35 U.S.C. 154(b) by 149 days.

(21) Appl. No.: 16/432,783

(22) Filed: Jun. 5, 2019

(65) Prior Publication Data

US 2020/0389386 A1   Dec. 10, 2020

(51) Int. Cl.
*H04L 12/707* (2013.01)
*H04L 12/26* (2006.01)
(Continued)

(52) U.S. Cl.
CPC .......... *H04L 45/22* (2013.01); *H04L 43/0858* (2013.01); *H04L 47/32* (2013.01); *H04L 49/90* (2013.01); *H04W 84/18* (2013.01)

(58) Field of Classification Search
CPC ..... H04L 43/0858; H04L 45/22; H04L 47/32; H04L 49/90; H04L 45/28; H04L 43/0823;
(Continued)

(56) References Cited

U.S. PATENT DOCUMENTS

2004/0184402 A1 * 9/2004 Alicherry ............... H04L 45/00
370/216
2004/0205238 A1 * 10/2004 Doshi ...................... H04L 45/50
709/241
(Continued)

FOREIGN PATENT DOCUMENTS

EP          1460811 A1    9/2004

OTHER PUBLICATIONS

Chitimalla, Divya, et al., "5G Fronthaul—Latency and Jitter Studies of CPRI Over Ethernet", Journal of Optical Communications and Networking, vol. 9, No. 2, Feb. 2017, 11 pages.
(Continued)

*Primary Examiner* — Mewale A Ambaye

(57) ABSTRACT

A node in a mesh network includes insertion circuitry to selectively delay first packets prior to insertion in a mesh network by a first time interval corresponding to a maximum failure detection time interval for the mesh network based on whether a failure has been detected in the mesh network. The node includes reception circuitry configured to selectively delay second packets received from the mesh network by a second time interval depending on whether the failure has been detected. The second time interval equals a maximum latency for the mesh network minus a sum of the maximum failure detection time interval and a propagation time along a working path. If a failure is detected, the second packets are delayed by a third time interval determined based on the maximum latency, the maximum failure detection time
(Continued)

interval, and a propagation time along a backup path for the working path.

20 Claims, 6 Drawing Sheets

(51) Int. Cl.
H04L 12/823 (2013.01)
H04L 12/861 (2013.01)
H04W 84/18 (2009.01)

(58) Field of Classification Search
CPC .. H04L 49/557; H04L 41/0695; H04W 24/04; H04W 28/0252; H04W 28/0289
See application file for complete search history.

(56) References Cited

U.S. PATENT DOCUMENTS

| | | | |
|---|---|---|---|
| 2006/0088063 A1* | 4/2006 | Hartung | H04L 45/125 370/498 |
| 2008/0205263 A1* | 8/2008 | Cooley | H04L 43/10 370/218 |
| 2009/0116397 A1 | 5/2009 | Denby et al. | |
| 2014/0064292 A1 | 3/2014 | Binetti et al. | |
| 2015/0249514 A1* | 9/2015 | Le Pallec | H04J 3/0664 370/216 |
| 2018/0279185 A1* | 9/2018 | Wu | H04W 36/38 |
| 2018/0304828 A1* | 10/2018 | Kitani | B60W 50/0205 |
| 2020/0275301 A1* | 8/2020 | Jamin | H04B 7/0413 |

OTHER PUBLICATIONS

Pointurier, Yvan, et al., "End-to-End Time-Sensitive Optical Networking: Challenges and Solutions", Journal of Lightwave Technology, vol. 37, No. 7, Apr. 1, 2019, 10 pages.

Chiaroni, Dominique, et al., "Potential of WDM Packets", 2017 International Conference on Optical Network Design and Modeling, May 2017, 6 pages.

Extended European Search Report dated Nov. 13, 2020 for European Application No. 20174807.6, 8 pages.

* cited by examiner

DYNAMIC SHARED PROTECTION USING REDUNDANT NETWORK PATHS

BACKGROUND

Upcoming generations of communication systems, such as Fifth Generation (5G) communication systems and Industry 4.0, are expected to enable applications such as virtual reality, augmented reality, reliable remote operation of machines, factory automation, network-assisted control of traffic and self-driving vehicles, and the cellular "Internet of Things (IoT)" that supports internetworking of physical devices such as appliances, vehicles, buildings, and other items that are embedded with electronics, software, sensors, actuators, and network connectivity that enable the devices to collect and exchange data over the Internet. One key feature of 5G communication systems is Ultra-Low Latency Reliable Communication (ULLRC) that targets end-to-end latencies of 1 millisecond (ms) (e.g., to support factory automation applications) and reliabilities of at least 99.999% (e.g., for automotive traffic control applications such as platooning). Another key feature of 5G communication systems is that most of the signal processing is done in the network by cloud servers rather than close to the radio antennas that support wireless communication, e.g., with IoT devices. The cloud server architecture is referred to herein as Cloud Radio Access Network (C-RAN). The latency requirements for C-RAN are even more stringent: round trip time budgets are expected to be in the range of 200 to 500 microseconds (μs). Although described herein in the context of a 5G communication system, the C-RAN architecture is also implemented in other communication systems such as Fourth Generation (4G) communication systems. A third key feature of 5G communication systems is network slicing, which permits operators to allocate resources of all types (network, CPU, storage) to a given service, without interfering with other services provided by the system.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

SUMMARY OF EMBODIMENTS

Figure 1:
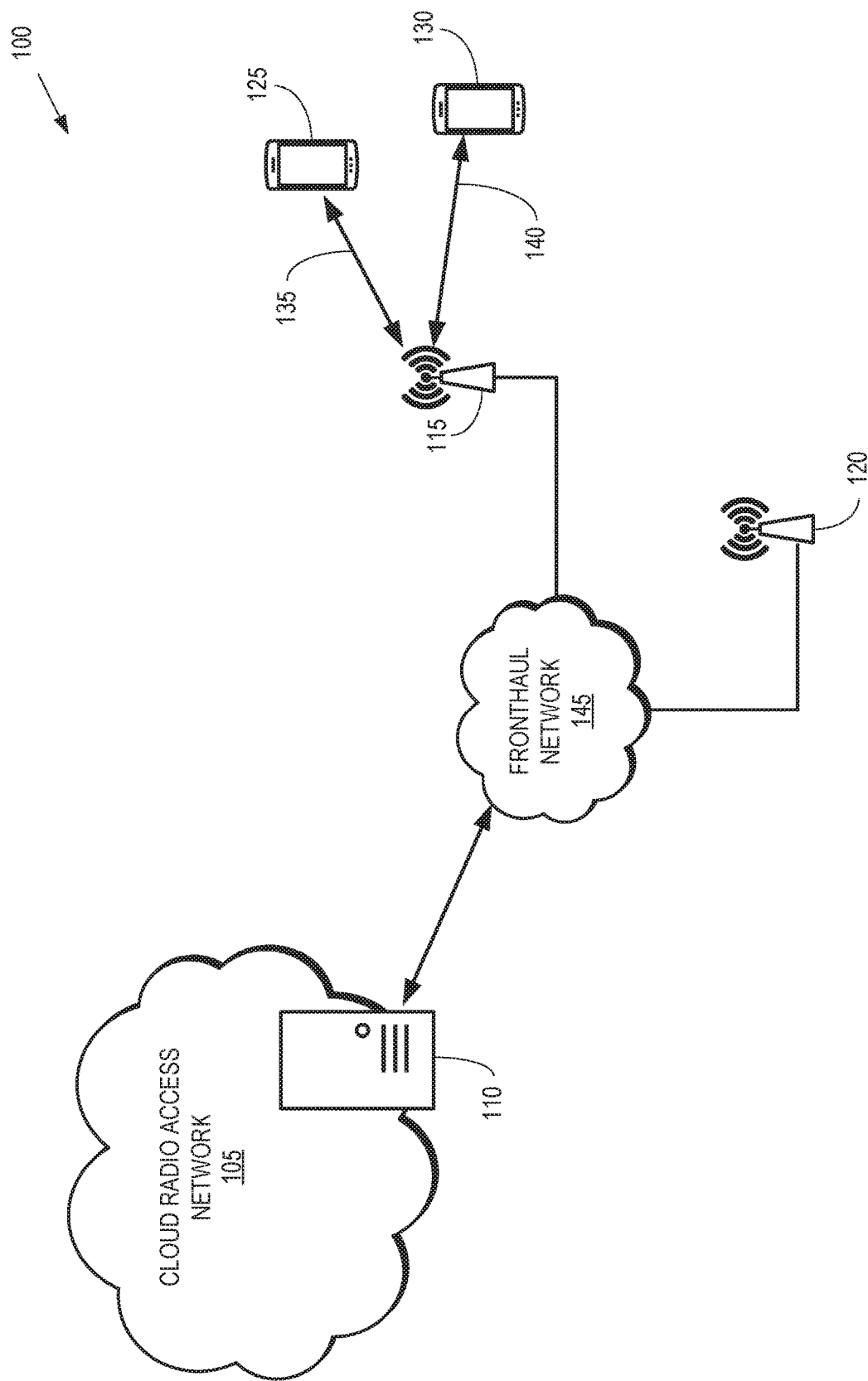
FIG. 1 is a block diagram of a communication system that implements dynamic shared protection using redundant network paths according to some embodiments.

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In some embodiments, an apparatus is provided. The apparatus includes insertion circuitry configured to selectively delay first packets prior to insertion in a mesh network by a first time interval based on whether a failure has been detected in the mesh network, the first time interval corresponding to a maximum failure detection time interval for the mesh network. The apparatus also includes reception circuitry configured to selectively delay second packets received from the mesh network by a second time interval depending on whether the failure has been detected.

Some embodiments of the apparatus include a first queue configured to store the first packets and a second queue configured to store copies of the first packets that are received from the first queue, wherein the second queue is configured to delay the copies of the first packets by the first time interval.

Some embodiments of the apparatus include a transmitter configured to transmit the first packets into the mesh network, wherein the insertion circuitry is configured to selectively provide the first packets from the first queue or the copies of the first packets from the second queue to the transmitter based on whether the failure is detected in the mesh network.

In some embodiments, the insertion circuitry is configured to provide the first packets from the first queue to the transmitter when the failure has not been detected and to provide the copies of the first packets from the second queue to the transmitter in response to detecting the failure in the mesh network.

In some embodiments, the transmitter is configured to transmit the first packets along a first path if the failure has not been detected, and wherein the transmitter is configured to transmit the first packets along a second path in response to detecting the failure.

Some embodiments of the apparatus include a third queue configured to receive the second packets via a third path if the failure has not been detected and via a fourth path in response to detecting the failure.

In some embodiments, the reception circuitry is configured to de-queue the second packets from the third queue after the second time interval if the failure has not been detected and after a third time interval in response to detecting the failure in the mesh network.

In some embodiments, the second time interval is determined based on a propagation time along the third path and the third time interval is determined based on a propagation time along the fourth path.

In some embodiments, the second time interval is equal to a maximum latency for the mesh network minus a sum of the maximum failure detection time interval and the propagation time along the third path. In some embodiments, the third time interval is equal to the maximum latency minus a sum of the maximum failure detection time interval and the propagation time along the fourth path.

In some embodiments, a method is provided. The method includes selectively delaying first packets prior to insertion in a mesh network by a first time interval based on whether a failure has been detected in the mesh network. The first time interval corresponds to a maximum failure detection time interval for the mesh network. The method also includes selectively delaying second packets received from the mesh network by a second time interval depending on whether the failure has been detected.

Some embodiments of the method include storing the first packets in a first queue and storing copies of the first packets that are received from the first queue in a second queue. The second queue is configured to delay the copies of the first packets by the first time interval.

Some embodiments of the method include selectively providing the first packets from the first queue or the second queue to a transmitter based on whether the failure is detected in the mesh network and transmitting, from the transmitter, the first packets or the copies of the first packets into the mesh network.

In some embodiments, selectively providing the first packets from the first queue or the second queue includes providing the first packets from the first queue to the transmitter when the failure has not been detected and providing the copies of the first packets from the second queue to the transmitter in response to detecting the failure in the mesh network.

In some embodiments, transmitting the first packets includes transmitting the first packets along a first path if the failure has not been detected and transmitting the copies of the first packets along a second path in response to detecting the failure.

Some embodiments of the method include receiving the second packets via a third path if the failure has not been detected and via a fourth path in response to detecting the failure and storing the second packets in a third queue.

Some embodiments of the method include de-queuing the second packets from the third queue after the second time interval if the failure has not been detected and after a third time interval in response to detecting the failure in the mesh network.

Some embodiments of the method include determining the second time interval based on a propagation time along the third path and determining the third time interval based on a propagation time along the fourth path.

In some embodiments, the second time interval is equal to a maximum latency for the mesh network minus a sum of the maximum failure detection time interval and the propagation time along the third path. In some embodiments, the third time interval is equal to the maximum latency minus a sum of the maximum failure detection time interval and the propagation time along the fourth path.

In some embodiments, an apparatus is provided. The apparatus includes at least one processor and at least one memory including computer program code. The at least one memory and the computer program code are configured to, with the at least one processor, cause the apparatus at least to perform selectively delaying first packets prior to insertion in a mesh network by a first time interval based on whether a failure has been detected in the mesh network. The first time interval corresponds to a maximum failure detection time interval for the mesh network. The at least one memory and the computer program code are also configured to, with the at least one processor, cause the apparatus at least to perform selectively delaying second packets received from the mesh network by a second time interval depending on whether the failure has been detected.

In some embodiments, the second time interval is equal to a maximum latency for the mesh network minus a sum of the maximum failure detection time interval and a propagation time along a working path.

DETAILED DESCRIPTION

Conventional communication systems use point-to-point communication (e.g. common public radio interface, CPRI) to transfer data between a core network and a signal processing unit (e.g., through the "backhaul" network) and between the signal processing unit and a base station (e.g., through the "fronthaul" network). For example, packets that include in-phase quadrature (IQ) samples of baseband signals are transported between radio equipment (RE) and a radio equipment controller (REC) in a C-RAN using CPRI over Ethernet. A conventional communication system uses statistical multiplexing to transfer the data, e.g., packets configured for CPRI over Ethernet. However, statistical multiplexing does not support low latency communication due to collisions between packets at nodes in the network (e.g., ethernet switches) and buffering of packets at the nodes. Furthermore, statistical multiplexing does not deliver proper slice isolation in systems that employ network slicing and a given resource could be required at the same time by two different services. For example, two services implemented using different network slices could use the same resources to forward packets. In order to meet the stringent latency requirements of ULLRC and C-RAN, as well as supporting network slicing, communication systems are configured to perform "deterministic networking" in which packet arrival times and latencies are known accurately in advance. One deterministic networking technique is time-aware shaping of packets that are scheduled for transmission by a transmission scheduler that selects packets for scheduling from a set of ingress queues.

In some cases, fronthaul networks in a C-RAN and other networks used in Industry 4.0 are implemented as transport networks in a mesh topology that supports multiple pathways through a set of nodes that convey packets between a source node and a destination node. A working path through a mesh network is represented by a subset of the nodes and the links that connect the source and destination node via the subset. Each link in the working path is separately protected by one or more preconfigured backup paths that traverse the mesh network from the source node to the destination node via other subsets of the nodes. Packets switch from the working path to a backup path in response to a failure of a link in the working path. Shared protection of the working path through the mesh network by one or more backup paths is a cost-efficient approach to providing resiliency in the mesh network. However, shared protection introduces non-deterministic latency for packets transmitted via the mesh network. The length of the backup path depends on the link that failed in the working path so the latency that is added to the packets that are traversing the backup path differs depending on which link failed. Thus, deterministic latency is not ensured and the latency of the mesh network is not guaranteed to remain below the maximum latency requirements in the event of a link failure. Moreover, link failures are not detected instantaneously and packets are lost during the failure discovery time because the source node continues to send packets along the failed working path until the failure is discovered.

FIGS. 1-6 illustrate embodiments of a mesh network including nodes that preserve deterministic latency without packet loss in the event of a link failure by delaying packets prior to insertion in the mesh network by a first time interval corresponding to a maximum failure detection time interval for the mesh network. In some embodiments, a source node includes a first queue that stores packets received at the source node. The first queue can provide the packets to a transmitter and a second queue that is configured to hold the packets for the first time interval. Thus, if a first packet leaves the first queue at a first time, the first packet would leave the second queue at a second time that is equal to the first time plus the first time interval. An insertion server selectively provides packets for transmission from the first queue or the second queue based on whether a failure is detected in the mesh network. The insertion server provides packets from the first queue to the transmitter when no failure has been detected and provides packets from the second queue to the transmitter in response to detecting a failure in the mesh network. The transmitter transmits the packets along the working path if no failure has been detected and along a backup path in response to detecting a failure in the mesh network.

Packets received at a destination node are delayed by different time intervals depending on whether a failure has been detected, e.g., whether the working path or the backup path is used to convey the packets. Packets received via the working path are delayed for a second time interval corresponding to a maximum latency for the mesh network minus a sum of a maximum failure detection time interval and a propagation time along the working path. In response to detecting a failure, the packets received via the backup path are delayed for a third time interval corresponding to the maximum latency minus a sum of the maximum failure detection time interval and a propagation time along the backup path that is selected based on the detected failure. Some embodiments of the destination node include a second server and a third queue that selectively delay the received packets for the second time interval or the third time interval depending on whether a failure has been detected. The second server de-queues the received packets from the third queue after the second time interval if no failure has been detected and de-queues the received packets from the third queue after the third time interval if a failure has been detected.

FIG. 1 is a block diagram of a communication system 100 that implements dynamic shared protection using redundant network paths according to some embodiments. The communication system 100 includes a Cloud Radio Access Network (C-RAN) that implements one or more cloud servers 110 to perform signal processing associated with one or more base stations 115, 120. The cloud server 110 implements a radio equipment controller (REC) and the base stations 115, 120 implement the radio equipment (RE). Some embodiments of the C-RAN satisfy latency requirements to support round trip time budgets in the range of 200 to 500 microseconds (μs). The base stations 115, 120 provide wireless connectivity within corresponding geographic areas or cells. In the illustrated embodiment, the base station 115 provides wireless connectivity to the user equipment 125, 130 over corresponding air interfaces 135, 140.

The cloud server 110 in the C-RAN 105 is connected to the base stations 115, 120 via a fronthaul network 145. Some embodiments of the fronthaul network 145 implement point-to-point communication using a common public radio interface (CPRI) to transfer data between the cloud server 110 and the base stations 115, 120. For example, packets that include in-phase quadrature (IQ) samples of baseband signals are transported between the RE implemented in the base station 115 and the REC in the cloud server 110 using CPRI over Ethernet. The fronthaul network 145 is implemented as a mesh network formed of a plurality of interconnected nodes (not shown in FIG. 1 in the interest of clarity) that provide multiple redundant paths from a source node to a destination node. For example, the source node can receive packets from the cloud server 110 and the destination node provides the packets to the base station 115. The nodes include insertion circuitry that selectively delays packets prior to insertion in the mesh network by a first time interval corresponding to a maximum failure detection time interval for the mesh network. The selection is based on whether a failure has been detected in the mesh network. The nodes also include reception circuitry configured to selectively delay second packets received from the mesh network by a second time interval or a third time interval depending on whether the failure has been detected.

Figure 2:
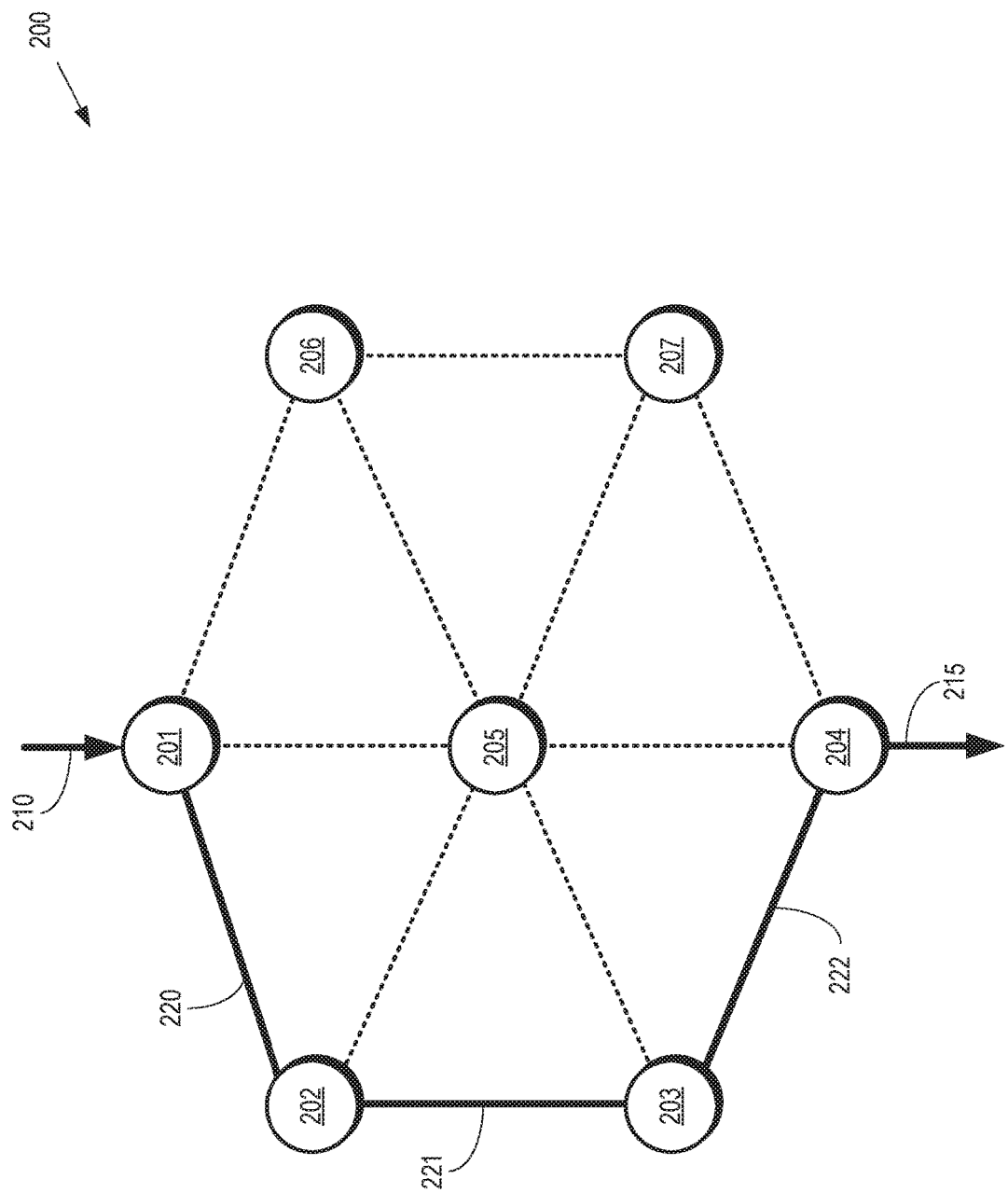
FIG. 2 is a block diagram of a mesh network that provides redundant network paths according to some embodiments.

FIG. 2 is a block diagram of a mesh network 200 that provides redundant network paths according to some embodiments. The mesh network 200 is implemented in some embodiments of the fronthaul network 145 shown in FIG. 1. The mesh network 200 includes a set of nodes 201, 202, 203, 204, 205, 206, 207, which are referred to as "the nodes 201-207." Incoming packets are received at the source node 201, as indicated by the arrow 210. For example, the incoming packets 210 are received from some embodiments of the cloud server 110 shown in FIG. 1. Outgoing packets are provided from the destination node 207, as indicated by the arrow 215. For example, the outgoing packets 215 are provided to some embodiments of the base station 115 shown in FIG. 1.

The mesh network 200 is preconfigured to route the incoming packets 210 along a working path that includes the nodes 201-204, which are connected by the links 220, 221, 222 (collectively referred to herein as "the links 220-222"). In some embodiments, the mesh network 200 is preconfigured based on information provided by an operator or a server, such as the cloud server 110 shown in FIG. 1. The working path transports packets in one or more deterministic flows, i.e., flows that have "zero" jitter and only include physical jitter, between the source node 201 and the destination node 204. The mesh network 200 is also preconfigured with one or more backup paths that use different subsets of the nodes 201-207 and their corresponding links to provide alternate/redundant pathways through the mesh network 200. The backup paths convey packets in response to failure of one of the links 220-222 in the working path.

Figure 3:
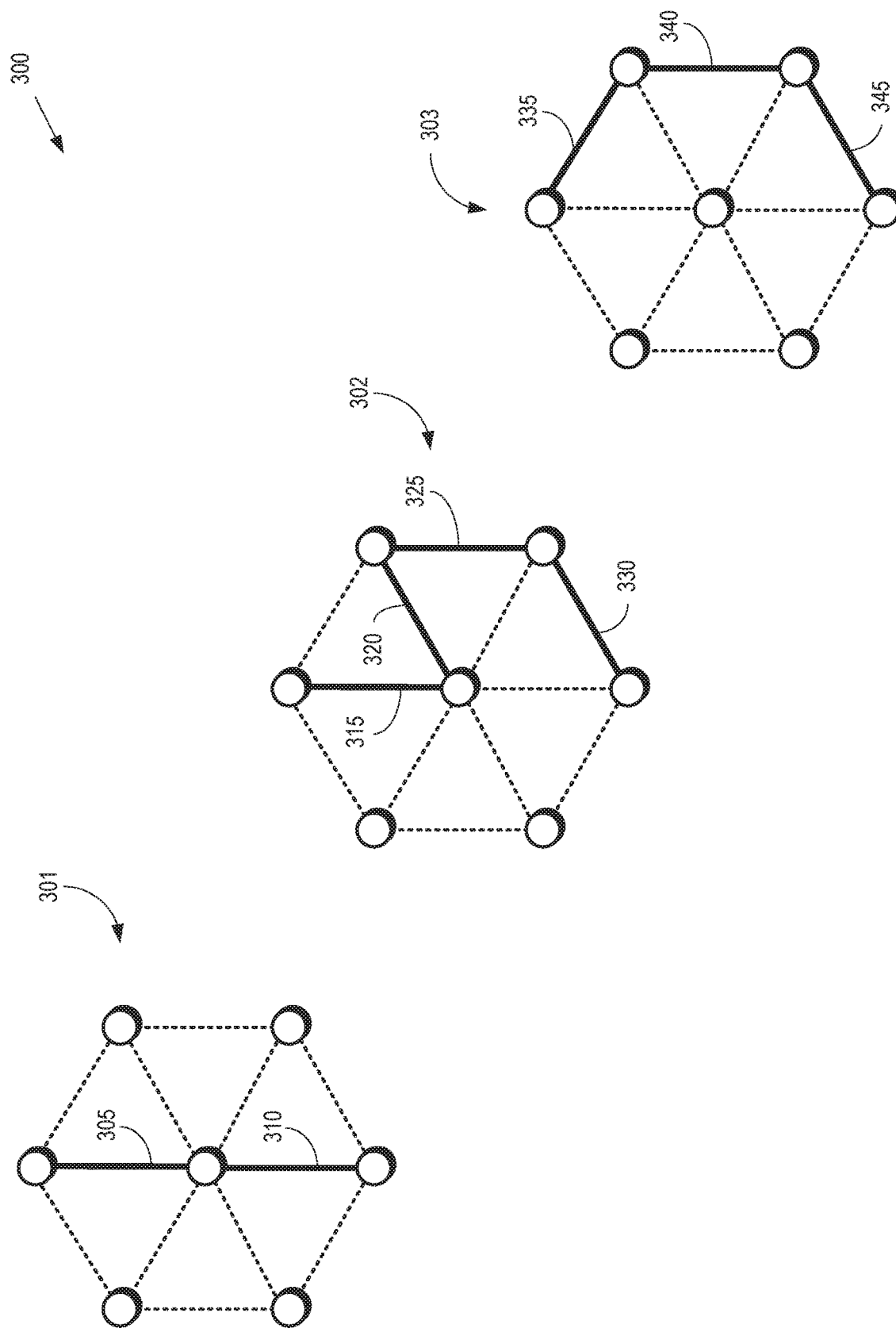
FIG. 3 is a block diagram of a set of backup paths that are used in the event of a link failure in a working path of a mesh network according to some embodiments.

FIG. 3 is a block diagram of a set 300 of backup paths for the mesh network 200 shown in FIG. 2 that are used in the event of a link failure in the working path according to some embodiments. The set 300 includes a first backup path in a first configuration 301 of the mesh network 200, a second backup path in a second configuration 302 of the mesh network 200, and a third backup path in a third configuration 303 of the mesh network 200. The nodes in the configuration 301-303 correspond to the nodes 201-207 in the mesh network 200 shown in FIG. 2, although reference numerals for the nodes 201-207 are not shown in FIG. 3 in the interest of clarity.

The first backup path in the first configuration 301 includes a link 305 that connects the node 201 and the node 205 and a link 310 that connects the node 205 and the node 204. The second backup path in the second configuration 302 includes a link 315 that connects the node 201 and the node 205, a link 320 that connects the node 205 and the node 206, a link 325 that connects the node 206 and the node 207, and a link 330 that connects the node 207 and the node 204. The third backup path in the third configuration 303 includes a link 335 that connects the node 201 and the node 206, a link 340 that connects the node 206 and the node 207, and a link 345 that connects the node 207 and the node 204.

One of the backup paths in one of the configurations 301-303 is selected to carry packets in response to failure of one of the links 220-222 in the working path. Switching from the working path to a backup path introduces latency into the packet transmission through the mesh network 200. The latency includes a time interval that is needed to detect the link failure and the propagation time along the backup path that is selected to convey packets in the event of the link failure. The maximum detection time interval and the worst case propagation time along a backup path are determined by characteristics of the mesh network 200 such as the size of the mesh network 200 or the round trip times through the mesh network 200. In some embodiments, the maximum detection time interval for detection by a fast control plane is estimated as being approximately equal to a round trip time (RTT) through the mesh network 200. The worst case propagation time is equal to a maximum of the propagation times along the working path and the backup paths. In some embodiments, the worst case propagation time is estimated as half of the RTT through the mesh network 200.

Packets are also lost when a link in the working path fails. For example, if the link 221 in the working path shown in FIG. 2 fails, then packets that were in-flight from the source node 201 to the node 202 and packets that were in-flight from the node 202 to the node 203 are likely to be lost. In the event of a link failure, the latency in the mesh network 200 is kept below a maximum latency and packet loss is prevented by selectively delaying packets at the source node 201 and the destination node 204 based on whether a link failure has been detected. Delays at the source node 201 are determined based on the maximum failure detection time interval for the mesh network 200 and delays at the destination node 204 are determined based on propagation times along the working path and one or more of the backup paths.

Figure 4:
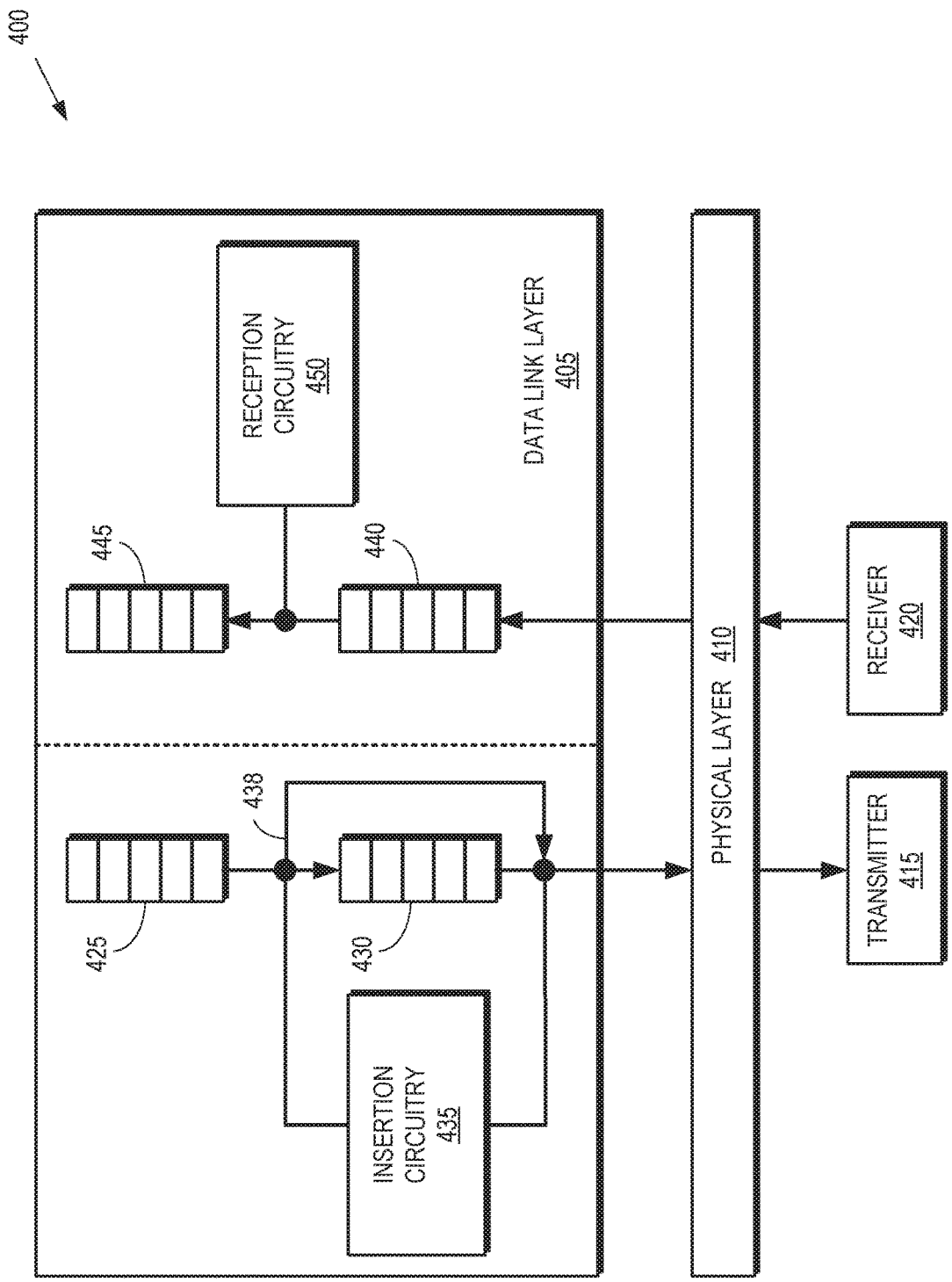
FIG. 4 is a block diagram of a node that selectively delays packets to support dynamic shared protection along redundant network paths according to some embodiments.

FIG. 4 is a block diagram of a node 400 that selectively delays packets to support dynamic shared protection along redundant network paths according to some embodiments. The node 400 is implemented in some embodiments of the fronthaul network 145 shown in FIG. 1 and the nodes 201-207 in the mesh network 200 shown in FIG. 2. The node 400 includes a data link layer 405 that performs node-to-node data transfer including error detection and correction. The node 400 also includes a physical layer 410 that converts digital bits received from the data link layer 405 into electrical, radio, or optical signals for transmission by a transmitter 415. The physical layer 410 also converts electrical, radio, or optical signals provided by a receiver 420 into digital bits for processing in the data link layer 405.

On the transmission side, the node 400 includes a client queue 425 that receives and holds packets that are to be transmitted by the node 400. The packets are received from an external network or another node in the mesh network that includes the node 400. The node 400 also includes an input queue 430 that receives packets from the client queue 425 and delays the packets by a time interval that corresponds to a maximum detection time interval for the mesh network. For example, the input queue 430 can be dimensioned to store client traffic received by a time interval equal to a maximum failure detection time for the mesh network. Some embodiments of the client queue 425 and the input queue 430 are implemented as first-in-first-out (FIFO) queues.

Insertion circuitry 435 in the node 400 de-queues packets from the client queue 425. One copy of the de-queued packet is provided to the physical layer 410 for transmission via the transmitter 415 via path 438 and another copy of the de-queued packet is provided to the input queue 430. The insertion circuitry 435 de-queues packets from the input queue 430 and provides the de-queued packets to the physical layer 410 for transmission via the transmitter 415 in response to detection of a link failure in the mesh network that includes the node 400. Some embodiments of the insertion circuitry 435 de-queues a packet from the head of the client queue 425 and sends this packet directly to the physical layer 410. The insertion circuitry 435 also provides a copy of the packet to the input queue 430 and adds a fixed latency to each packet that corresponds to the maximum failure detection time. In response to detecting a link failure, the insertion circuitry 435 routes all client packets to the input queue 430 and serves packets from a head of the input queue 430 (e.g., in FIFO order) without any latency.

On the reception side, the node 400 includes an output queue 440 that receives packets from the physical layer 410 in response to the receiver 420 receiving the packets from an external node or another node in the mesh network. The node 400 also includes a client queue 445 that receives packets from the output queue 440. Some embodiments of the output queue 440 and the client queue 445 are implemented as FIFO queues. Reception circuitry 450 selectively delays packets in the output queue 440 before providing the packets to the client queue 445. Some embodiments of the reception circuitry 450 delay packets by a time interval that is determined based on a maximum propagation delay along a working path as long as no link failure has been detected. In response to detection of a link failure in the mesh network, the reception circuitry 450 delays packets by a time interval that is determined based on a maximum propagation delay along one or more backup paths. In some embodiments, the reception circuitry 450 de-queues the packets from a head-of-line of the output queue 440 (e.g., in FIFO order) by adding a fixed latency to each packet. If no link failure has been detected in the mesh networks 200, the fixed latency is equal to a maximum latency for the mesh network 200 minus a sum of the maximum failure detection time and the propagation time for the working path. In response to detecting a link failure into mesh network 200, the reception circuitry 450 changes the fixed latency to a time interval that is equal to the maximum latency minus a sum of the maximum failure detection time and the propagation time for the backup path that is used in the event of the link failure. The reception circuitry 450 provides the de-queued packets from the output queue 440 to the client queue 445 after the selected delay time interval.

Delaying the packets in the queues 425, 430, 440, 445 as discussed herein prevents packet loss in the mesh network during a transition from a working path to a backup path in the event of a link failure. For example, if a link failure is detected in the mesh network 200 at a time $t_0$, a backup path k is used to convey packets from the source node to the destination node. The inter-arrival time interval between subsequent arrivals of claim packets is constant and equal to $\Delta p$. The last packet that is guaranteed to have been successfully received at the destination node arrived at the insertion circuitry 435 at a time:

$$t_0 - T_{fail\ detection} - \Delta p$$

In this equation, the maximum failure detection time is referred to as $T_{fail\ detection}$. This packet is referred to as $P_{-1}$. The first packet that is potentially lost due to the link failure arrived at the insertion circuitry 435 at a time:

$$t_0 - T_{fail\ detection}$$

This packet is referred to as $P_0$ and the copy of the packet $P_0$ that is stored in the input queue 430 is provided to the physical layer 410 for transmission. At the time $t_0$, the packet $P_0$ is the head-of-line packet at the input queue 430 since the input queue 430 delays packets by the maximum failure detection time. Arrival and departure times of the packets $P_{-1}$, $P_0$ are summarized in Table 1.

TABLE 1

|  | Packet $P_{-1}$ | Packet $P_0$ |
| --- | --- | --- |
| Arrival at insertion circuitry 435 | $t_0 - T_{fail\ detection} - \Delta p$ | $t_0 - T_{fail\ detection}$ |
| Departure from the node 400 | $t_0 - T_{fail\ detection} - \Delta p$ | $t_0$ |
| Arrival at destination node | $t_0 - T_{fail\ detection} + T_{prop,\ working}$ | $t_0 + T_{prop,\ backup,\ k}$ |
| Departure from reception circuitry in the destination node | $t_0 - T_{fail\ detection} - \Delta p + T_{prop,\ working} + \Delta_w =$ $t_0 - T_{fail\ detection} - \Delta p +$ $T_{max,\ latency}$ | $t_0 + T_{prop,\ backup,\ k} + \Delta_{Bk} =$ $t_0 - T_{fail\ detection} + T_{max,\ latency}$ |

In the event of a link failure, the input queue 430 and the insertion circuitry 435 delay packets by the time interval:

$$T_{fail\ detection}$$

The input queue 430 and the insertion circuitry 435 delay packets that are received via the backup path k by the time interval:

$$\Delta_{Bk} = T_{max,latency} - T_{fail\ detection} - T_{prop,backup,k}$$

Thus, the packets $P_{-1}$, $P_0$ depart from the reception circuitry in the destination node in sequence, separated by a time interval $\Delta p$, with a latency that is equal to $T_{max,latency}$. No packets are lost from the deterministic flow during the switch from the working path to the backup path.

Delaying the packets in the queues 425, 430, 440, 445 as discussed herein also maintains latency below a maximum latency during the transition from the working path to the backup path. Table 2 illustrates the network latencies during nominal operation (without a link failure) and in the event of a failure of the link k.

TABLE 2

|  | Nominal Operation | Link Failure |
| --- | --- | --- |
| Arrival at insertion circuitry | $t_x$ | $t_x$ |
| Departure from the node | $t_x$ | $t_x + T_{fail\ detection}$ |
| Arrival at destination node | $t_x + T_{prop,\ working}$ | $t_x + T_{fail\ detection} + T_{prop,\ backup,\ k}$ |
| Departure from reception circuitry in the destination node | $t_x + T_{prop,\ working} + T_{fail\ detection} + \Delta_w =$ $t_x + T_{max,\ latency}$ | $t_x + T_{prop,\ backup,\ k} + \Delta_{Bk} =$ $t_x + T_{max,\ latency}$ |

Thus, the packets incur a maximum latency that is equal to $T_{max,latency}$ in the case of nominal network operation and in the case of a link failure.

Figure 5:
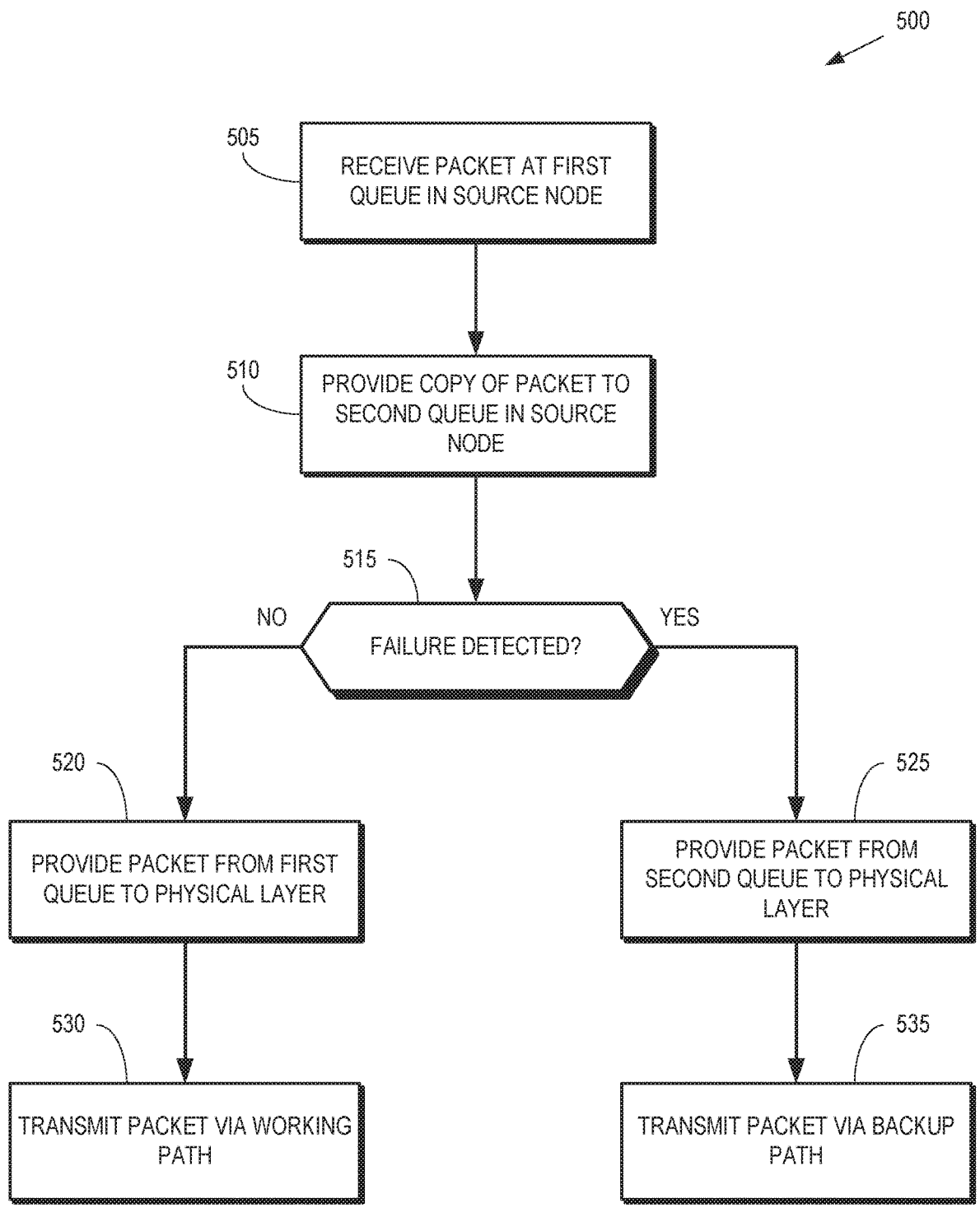
FIG. 5 is a flow diagram of a method of selectively delaying the insertion of packets from a node into a mesh network according to some embodiments.

FIG. 5 is a flow diagram of a method 500 of selectively delaying the insertion of packets from a node into a mesh network according to some embodiments. The method 500 is implemented in a source node such as the source nodes in some embodiments of the fronthaul network 145 shown in FIG. 1, the nodes 201-207 shown in FIG. 2, and the node 400 shown in FIG. 4.

At block 505, the source node receives a packet in a first queue such as the client queue 425 shown in FIG. 4. When the packet arrives at the head of the first queue, the source node provides (at block 510) a copy of the packets to a second queue such as the input queue 430 shown in FIG. 4. The packet is selectively forwarded from the first queue or the second queue depending on whether a link failure has been detected in the mesh network.

At decision block 515, insertion circuitry in the node determines whether a link failure has been detected. If not, the method 500 flows to block 520. If a link failure has been detected, the method 500 flows to block 525.

At block 520, the packet is provided from the first queue to the physical layer substantially without delay or substantially immediately. At block 530, a transmitter transmits information representative of the packet via a working path through the mesh network.

At block 525, the insertion circuitry provides the packet from the second queue to the physical layer in response to detecting the link failure. The packet is delayed in the second queue by a time interval corresponding to a maximum failure detection time interval for the mesh network. At block 535, the transmitter transmits information representative of the packet via a backup path through the mesh network.

Figure 6:
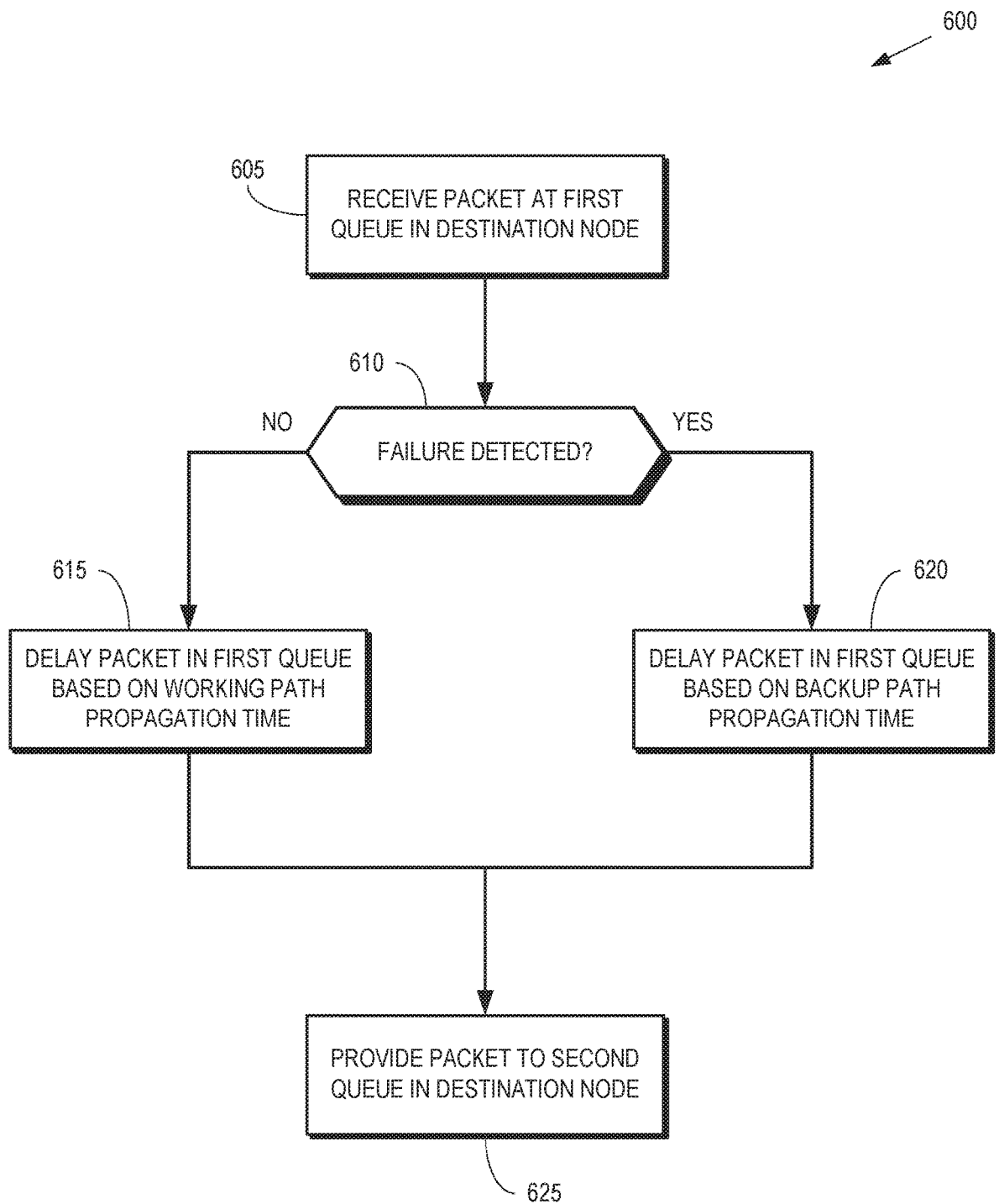
FIG. 6 is a flow diagram of a method of selectively delaying packets that are received by a node from a mesh network according to some embodiments.

FIG. 6 is a flow diagram of a method 600 of selectively delaying packets that are received by a node into a mesh network according to some embodiments. The method 600 is implemented in a destination node such as the destination nodes in some embodiments of the fronthaul network 145 shown in FIG. 1, the nodes 201-207 shown in FIG. 2, and the node 400 shown in FIG. 4.

At block 605, the destination node receives a packet and stores the packet in the first queue. At decision block 610, the destination node determines whether a link failure is detected in the mesh network. If not, in which case the packet is received via a working path through the mesh network, the method 600 flows to block 615 and the packet is delayed in the first queue for a time interval that is determined based on a propagation time interval for the working path, as discussed herein. If a link failure has been detected, in which case the packet is received via a backup path through the mesh network, the mesh networks 600 flows to block 620 and the packet is delayed in the first queue for a time interval that is determined based on a propagation time interval for the backup path, as discussed herein. The delayed packets are de-queued from the first queue and provided (at block 625) to a second queue after the appropriate delay time interval.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., readonly memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

As used herein, the term "circuitry" may refer to one or more or all of the following:
a) hardware-only circuit implementations (such as implementations and only analog and/or digital circuitry) and
b) combinations of hardware circuits and software, such as (as applicable):
  i. a combination of analog and/or digital hardware circuit(s) with software/firmware and
  ii. any portions of a hardware processor(s) with software (including digital signal processor(s), software, and memory(ies) that work together to cause an apparatus, such as a mobile phone or server, to perform various functions) and
c) hardware circuit(s) and/or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An apparatus, comprising:
insertion circuitry configured to selectively delay first packets prior to insertion in a mesh network by a first time interval based on whether a failure has been detected in the mesh network, the first time interval corresponding to a maximum failure detection time interval for the mesh network; and
reception circuitry configured to selectively delay second packets received from the mesh network by a second time interval depending on whether the failure has been detected.

2. The apparatus of claim 1, further comprising:
a first queue configured to store the first packets; and
a second queue configured to store copies of the first packets that are received from the first queue, wherein the second queue is configured to delay the copies of the first packets by the first time interval.

3. The apparatus of claim 2, further comprising:
a transmitter configured to transmit the first packets into the mesh network, wherein the insertion circuitry is configured to selectively provide the first packets from the first queue or the copies of the first packets from the second queue to the transmitter based on whether the failure is detected in the mesh network.

4. The apparatus of claim 3, wherein the insertion circuitry is configured to provide the first packets from the first queue to the transmitter when the failure has not been detected and to provide the copies of the first packets from the second queue to the transmitter in response to detecting the failure in the mesh network.

5. The apparatus of claim 4, wherein the transmitter is configured to transmit the first packets along a first path if the failure has not been detected, and wherein the transmitter is configured to transmit the first packets along a second path in response to detecting the failure.

6. The apparatus of claim 3, further comprising:
a third queue configured to receive the second packets via a third path if the failure has not been detected and via a fourth path in response to detecting the failure.

7. The apparatus of claim 6, wherein the reception circuitry is configured to de-queue the second packets from the third queue after the second time interval if the failure has not been detected and after a third time interval in response to detecting the failure in the mesh network.

8. The apparatus of claim 7, wherein the second time interval is determined based on a propagation time along the third path and the third time interval is determined based on a propagation time along the fourth path.

9. The apparatus of claim 8, wherein the second time interval is equal to a maximum latency for the mesh network minus a sum of the maximum failure detection time interval and the propagation time along the third path, and wherein the third time interval is equal to the maximum latency minus a sum of the maximum failure detection time interval and the propagation time along the fourth path.

10. A method, comprising:
   selectively delaying first packets prior to insertion in a mesh network by a first time interval based on whether a failure has been detected in the mesh network, the first time interval corresponding to a maximum failure detection time interval for the mesh network; and
   selectively delaying second packets received from the mesh network by a second time interval depending on whether the failure has been detected.

11. The method of claim 10, further comprising:
   storing the first packets in a first queue; and
   storing copies of the first packets that are received from the first queue in a second queue, wherein the second queue is configured to delay the copies of the first packets by the first time interval.

12. The method of claim 11, further comprising:
   selectively providing the first packets from the first queue or the second queue to a transmitter based on whether the failure is detected in the mesh network; and
   transmitting, from the transmitter, the first packets or the copies of the first packets into the mesh network.

13. The method of claim 12, wherein selectively providing the first packets from the first queue or the second queue comprises providing the first packets from the first queue to the transmitter when the failure has not been detected and providing the copies of the first packets from the second queue to the transmitter in response to detecting the failure in the mesh network.

14. The method of claim 13, wherein transmitting the first packets comprises transmitting the first packets along a first path if the failure has not been detected and transmitting the copies of the first packets along a second path in response to detecting the failure.

15. The method of claim 12, further comprising:
   receiving the second packets via a third path if the failure has not been detected and via a fourth path in response to detecting the failure; and
   storing the second packets in a third queue.

16. The method of claim 15, further comprising:
   de-queuing the second packets from the third queue after the second time interval if the failure has not been detected and after a third time interval in response to detecting the failure in the mesh network.

17. The method of claim 16, further comprising:
   determining the second time interval based on a propagation time along the third path; and
   determining the third time interval based on a propagation time along the fourth path.

18. The method of claim 17, wherein the second time interval is equal to a maximum latency for the mesh network minus a sum of the maximum failure detection time interval and the propagation time along the third path, and wherein the third time interval is equal to the maximum latency minus a sum of the maximum failure detection time interval and the propagation time along the fourth path.

19. An apparatus comprising:
   at least one processor; and
   at least one memory including computer program code;
   the at least one memory and the computer program code configured to, with the at least one processor, cause the apparatus at least to perform:
      selectively delaying first packets prior to insertion in a mesh network by a first time interval based on whether a failure has been detected in the mesh network, the first time interval corresponding to a maximum failure detection time interval for the mesh network; and
      selectively delaying second packets received from the mesh network by a second time interval depending on whether the failure has been detected.

20. The apparatus of claim 19, wherein the second time interval is equal to a maximum latency for the mesh network minus a sum of the maximum failure detection time interval and a propagation time along a working path.

* * * * *